United States Patent [19]
Fujino

[11] Patent Number: 4,461,014
[45] Date of Patent: Jul. 17, 1984

[54] CARRIER REGENERATING CIRCUIT
[75] Inventor: Tadashi Fujino, Hyogo, Japan
[73] Assignee: Mitsubishi Denki Kabushiki Kaisha, Tokyo, Japan
[21] Appl. No.: 304,499
[22] Filed: Sep. 22, 1981
[30] Foreign Application Priority Data Sep. 23, 1980 [JP] Japan .............................. 55-132500
Sep. 23, 1980 [JP] Japan .............................. 55-132501

[51] Int. Cl.³ ............................................ H04L 27/22
[52] U.S. Cl. .................................... 375/83; 328/155; 329/110
[58] Field of Search ................. 375/46, 52, 53, 55, 375/80, 83, 84, 85, 86, 102, 118, 3; 307/511, 516; 328/155; 329/50, 104, 112, 110

[56] References Cited
U.S. PATENT DOCUMENTS 3,624,274 11/1971 Araki .................................... 328/155
3,812,433 5/1974 Bradley .............................. 328/155
4,310,803 1/1982 Kurihara ............................ 328/155
4,339,725 7/1982 Ichiyoshi ............................. 375/83

FOREIGN PATENT DOCUMENTS 2001218 1/1979 United Kingdom ................. 375/86

OTHER PUBLICATIONS

Tsuji, "TDMA Burst Modem for SBS Satellite Communication System", Fujitsu, vol. 31, No. 3, 1980, pp. 62-74.

Primary Examiner—Robert L. Griffin
Assistant Examiner—Stephen Chin
Attorney, Agent, or Firm—Sughrue, Mion, Zinn, Macpeak & Seas

[57] ABSTRACT

In a PSK carrier regenerating circuit, a second regeneration path is provided for regenerating a carrier which is less susceptible to cycle slip phase errors. A variable phase shifter is provided at the output of the first carrier regeneration path to selectively shift the phase thereof in accordance with a phase comparison of the first and second regenerated carriers.

7 Claims, 11 Drawing Figures

FIG. 4
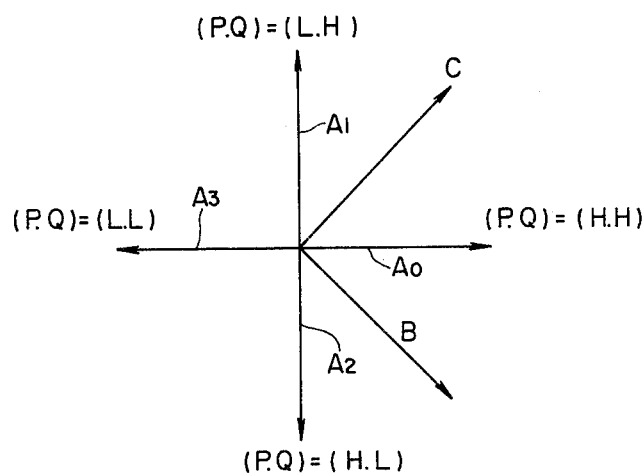
FIG. 6(a)
FIG. 6(b)
FIG. 6(c)
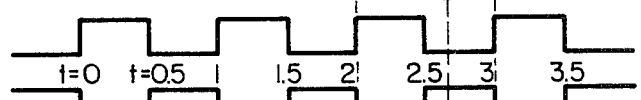
FIG. 6(d)
FIG. 6(e)
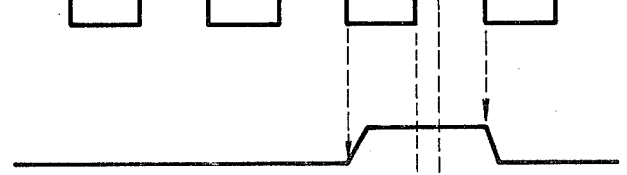
FIG. 6(f)

CARRIER REGENERATING CIRCUIT

BACKGROUND OF THE INVENTION

This invention relates to a carrier regenerating circuit which obtains a regenerated carrier from a phase shift keying signal (hereinafter referred to as "a PSK signal", when applicable).

A conventional carrier regenerating circuit of this type is as shown in FIG. 1. In FIG. 1, reference numeral 1 designates an M-phase PSK signal input; 2, an M frequency multiplier; 3, a band pass filter (hereinafter referred to as "a BPF 3" when applicable); 4, a 1/M frequency divider; 5, a regenerated carrier output.

The operation of the circuit shown in FIG. 1 will now be briefly described. In general, the M-phase PSK signal has a phase of $2\pi i/M$ radians (i=0, 1, 2 . . . and M−1) at each time instant. When the signal is subjected to M multiplication by the M frequency multiplier 2, then the signal has a zero phase and a frequency which is multiplied by a factor M. When this non-modulated signal passes through the BPF 3, the noise component is decreased, as a result of which a signal excellent in S/N ratio is outputted by the BPF 3. When the signal has passed through the 1/M frequency divider 4, the signal is returned to its original frequency and has a phase of $2\pi i/M$. Thus, a regenerated carrier can be obtained.

In such a conventional circuit, in order to reduce the frequency of occurrence of cycle slip, it is necessary to reduce the band width of the BPF 3. If the band width is reduced excessively, then the carrier frequency of the input signal is somewhat varied, and when the center frequency of the filter is slightly shifted by temperature variation, the output phase error may become excessive. Therefore, the performance of the carrier regenerating circuit is greatly degraded. For the above-described reason, the band width of the BPF cannot be reduced excessively in manufacturing the carrier regenerating circuit, but this is in contradiction with the necessity of reducing the band width of BPF 3 in order to decrease the frequency of occurrence of cycle slip.

SUMMARY OF THE INVENTION

This invention has been developed in order to eliminate the above-described difficulties accompanying a conventional carrier regenerating circuit. More specifically, an object of this invention is to provide a carrier regenerating circuit which is obtained merely by adding a simple circuit to a conventional carrier regenerating circuit, to decrease the frequency of generation of slip cycle without degrading the carrier regenerating performance.

More specifically, the first BPF is provided with a relatively wide band width so that normal phase errors are kept to a minimum although the occurrence of cycle slip phase errors may be excessive. An auxiliary circuit is provided substantially in parallel with the conventional carrier regenerator, and the auxiliary circuit includes a second BPF having a narrower band width which will be subjected to normal phase errors but will have decreased frequency of cycle slip phase errors. Thus, while the second BPF output may include phase errors, these errors will in general be relatively small and it can be assumed that, if there is an excessive phase difference between the outputs of the first and second frequency dividers, a cycle slip error has occurred in the first BPF output.

In the carrier regenerating circuit according to the present invention, a variable phase shifter is provided at the output of the first 1/M frequency divider. The output of the first 1/M divider or phase shifter is constantly phase compared with that of the second 1/M frequency divider and, if an excessive phase shift is detected, the phase shifter is controlled to shift the phase of the first 1/M frequency divider output in the proper direction to correct for the cycle slip.

BRIEF DESCRIPTION OF THE DRAWINGS

FIG. 4 is an explanatory diagram showing the phases of outputs of various circuit elements in FIG. 3;

FIG. 6(a)–FIG. 6(f) are waveforms for a description of the operation of various circuit elements in FIG. 5.

DESCRIPTION OF THE PREFERRED EMBODIMENTS

One embodiment of this invention will now be described with reference to FIG. 2.

Figure 1:
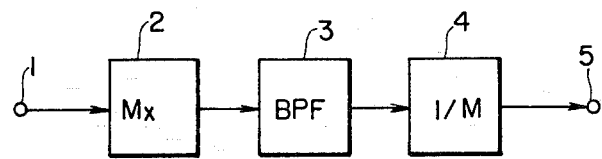
FIG. 1 is a block diagram showing a conventional carrier regenerating circuit.
Figure 2:
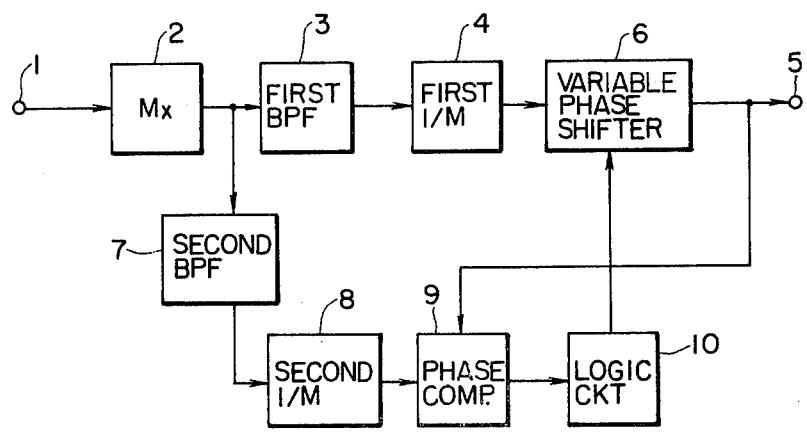
FIG. 2 is a block diagram of a carrier regenerating circuit according to one embodiment of this invention.

In FIG. 2, reference numerals 1 through 5 designate the same circuit elements as those shown in FIG. 1; 6, a variable phase shifter for shifting the phase of the output of the 1/M frequency divider 4 (hereinafter referred to as "a first 1/M frequency divider 4", when applicable); 7, a second BPF whose band width is smaller than that of the BPF 5 (hereinafter referred to as "a first BPF", when applicable); 8, a second 1/M frequency divider; 9, a phase comparator for subjecting the output of the variable phase shifter 6 and the output of the second 1/M frequency divider 8 to phase comparison; and 10 a logic circuit for recording the output of the phase comparator 9 and controlling the amount of phase shift in the variable phase shifter 6.

The operation of the carrier regenerating circuit shown in FIG. 2 will now be described.

The M-phase PSK signal applied to the input terminal 1 is subjected to M multiplication by the M frequency multiplier 2, so than unmodulated signal whose frequency is M times that of the input signal is provided. The unmodulated signal is applied to the first BPF 3, where the noise component is decreased. The output signal of the first BPF 3 is applied to the first 1/M frequency divider 4, where it is subjected to 1/M frequency division. Thus, the first 1/M frequency divider 4 outputs an unmodulated carrier. The unmodulated carrier is applied to the variable phase shifter 6, at the output of which a regenerated carrier is provided. In this operation, as the band width of the first BPF 3 is not excessively narrow, very little phase error is caused. As a corollary, however, the frequency of occurrence of cycle slip cannot be decreased.

In order to decrease the frequency of occurrence of cycle slip, the above-described unmodulated signal whose frequency has been multiplied by a factor M is applied to the second BPF 7, the output signal of which is applied to the second 1/M frequency divider 8, whereupon an unmodulated carrier is provided at the output of the frequency divider 8. The band width of the second BPF 7 is made much smaller than that of the first BPF 3, so that while normal phase errors cannot be decreased, the frequency of occurrence of cycle slip can be decreased. The output phase of the variable phase shifter 6 is compared with the output phase of the second 1/M frequency divider 8 in the phase comparator 9.

With this arrangement, the output of the second 1/M frequency divider 8 will be much less prone to cycle slip generation than the output of the variable phase shifter 6. Therefore, when it has been determined by the phase comparator that the output phase of the variable phase shifter 6 is leading that of the second 1/M frequency divider 8 by $2\pi j/M$ radians (j=1, 2, ... and M−1), then it can be assumed that the phase lead has been caused by the cycle slip of the output phase of the first 1/M frequency divider 4 rather than by a phase error in the output of the second 1/M frequency divider 8. Therefore, if the logic circuit 10 causes the variable phase shifter 6 to lag the phase of its input signal by $2\pi j/M$ radians, the output phase of the variable phase shifter 6 will again coincide with the correct phase which it had before the cycle slip. Thus, the frequency of occurrence of cycle slip in the regenerated carrier output 5 will be no more than that of the output of the second 1/M frequency divider 8.

The above-described circuitry is of the closed loop type in which the output phase of the variable phase shifter 6 is detected so that upon generation of cycle slip, it is fed back to control the variable phase shifter 6 so as to remove the phase error from its output. Therefore, even when the phase comparator 9 makes an erroneous momentary operation, for instance in correcting the output for a cycle slip although no cycle slip has occurred in the output of the variable phase shifter 6, the erroneous operation will be corrected immediately.

Having described a generalized carrier regenerating circuit for an M-phase PSK signal, a specific example of a carrier regenerating circuit for a widely-used four-phase PSK signal will now be described.

Figure 3:
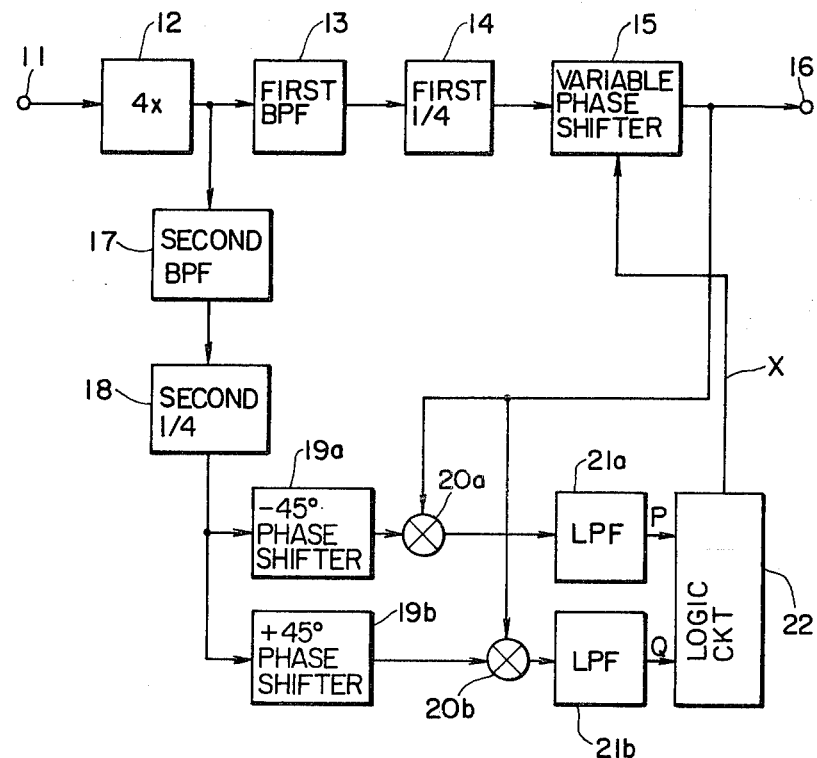
FIG. 3 is a block diagram showing one concrete example of the carrier regenerating circuit of the invention, i.e. a carrier regenerating circuit for a four-phase PSK signal.

FIG. 3 is a block diagram showing one example of a carrier regenerating circuit for a four-phase PSK signal. In FIG. 3, reference numeral 11 designates a four-phase PSK signal input; 12, a 4X frequency multiplier; 13, a first BPF; 14, a first ¼ frequency divider; 15, a variable phase shifter for shifting the phase of an input as desired; 16, a regenerated carrier output; 17, a second BPF whose band width is smaller than that of the first BPF13; 18, a second ¼ frequency divider; 19a, a −45° phase shifter; 19b, a +45° phase shifter; 20a and 20b, phase comparators for comparing the output phase of the variable phase shifter 15 with the output phases of the phase shifters 19a and 19b, respectively; 21a and 21b, low-pass filters (hereinafter referred to as "LPF's 21a and 21b", when applicable); and 22, a logic circuit for controlling the amount of phase shift in the variable phase shifter 15 according to the comparison results of the mixers 20a and 20b.

The operation of the carrier regenerating circuit shown in FIG. 3 will be described.

The 4-phase PSK signal applied to the input terminal 11 is applied to the 4X frequency multiplier 12, where its frequency is multiplied by a factor of four. As a result, an unmodulated signal whose frequency is four times that of the input signal is outputted by the multiplier 12. The unmodulated signal, after passing through the first BPF 13, is applied to the first ¼ frequency divider 14, where it is subjected to ¼ frequency divider 14 and is applied to the variable phase shifter 15, as a result of which a regenerated carrier having a phase of $i\pi/4$ radians (i=0, 1, 2 and 3) is provided at the output terminal.

On the other hand, the output signal of the 4X frequency multiplier 12 is further applied through the second BPF 17 and the second ¼ frequency divider 18 to the −45° phase shifter 19a and the +45° phase shifter 19b. The outputs of these phase shifters 19a and 19b are applied to the phase comparators 20a and 20b, where their phases are respectively compared to the output phase of the variable phase shifter 15.

FIG. 4 shows the output phases of the variable phase shifter 15 and of the phase shifters 19a and 19b. It is assumed that the output phase A of the variable phase shifter 15 is $A_0 = 0°$, the output phase B of the −45° phase shifter 19a is −45°, and the output phase C of the +45° phase shifter 19b is +45°. In this case, the outputs P and Q of the LPF's 21a and 21b are both at a high logic level (hereinafter referred to merely as "H", when applicable), i.e. in their normal condition, and no phase shifting of the frequency divider output is necessary.

Subsequently, if a cycle slip is caused as shown in Table 1 below, so that the output of the variable phase shifter 15 is shifted by +90° and its phase is therefore at $A_1 = +90°$, the output P of the LPF 21a assumes a low logic level (hereinafter referred to merely as "L", when applicable), while the output Q of the LPF 21b is maintained at "H". When the output of the variable phase shifter 15 is shifted by −90° or 180° and its phase is therefore at $A_2 = -90°$ or $A_3 = 180°$, the output P and Q of the LPF's 21a and 21b will be at "H" and "L", or "L" and "L", respectively. In each of these latter three cases, a phase shift of the output signal will be required.

TABLE 1

| P | Q | Variable phase shifter output phase | Logic circuit output |
|---|---|---|---|
| H | H | Normal | Not operated |
| L | H | Cycle slip of +90° turn | Shift the output of the variable phase shifter through −90° |
| H | L | Cycle slip of −90° turn | Shift the output of the variable phase shifter through +90° |
| L | L | Cycle slip of 180° turn | Shift the output of the variable phase shifter through 180° |

Therefore, when the outputs P and Q are at "H" and "H", respectively, the output phase of the variable phase shifter 15 is maintained as it is. When the outputs P and Q are at "L" and "H", "H" and "L", and "L" and "L", the logic circuit 22 provides instruction signals to cause the phase shifter 15 to shift its output phase by −90°, +90° and 180°, respectively. Since the variable phase shifter 15 operates according to these instruction signals, the frequency of occurrence of cycle slip is decreased.

In the above example, the generation of a 180° cycle slip has not been described in detail but should be apparent. In any event, in the above-described example a 180° cycle slip rarely occurs due to employment of the ¼ frequency dividers.

Figure 5:
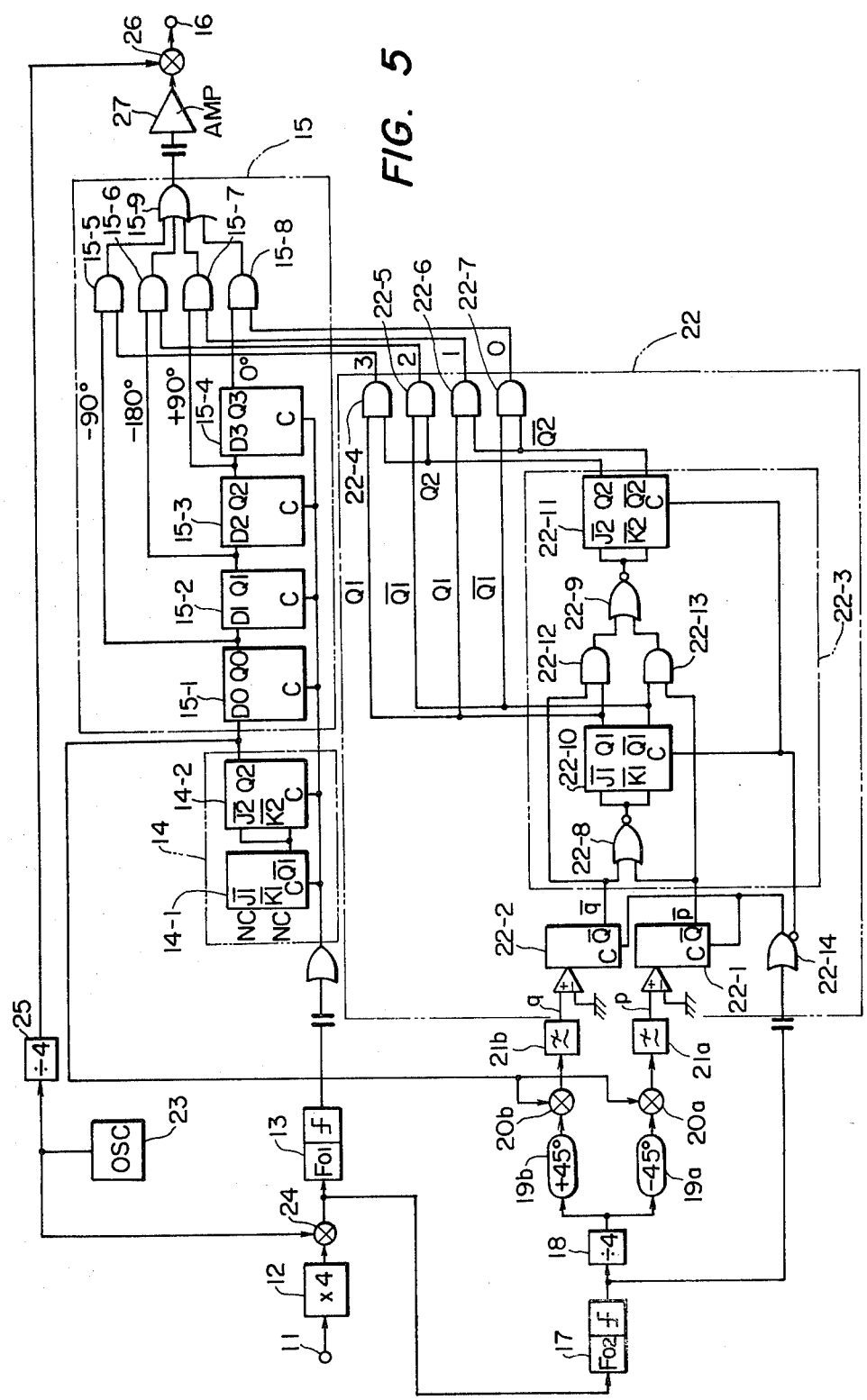
FIG. 5 is a circuit diagram, partly as a block diagram, showing a detailed circuit of a second embodiment.

FIG. 5 is one example of a circuit diagram of a second embodiment of the invention. In the circuits of FIGS. 2 and 3, the output of the phase shifter is fed back, and this may result in jittering as the output of the phase shifter is corrected and is then uncorrected when the phase comparison circuitry shows no error. This will generally not be a problem due to the high operating frequency of the circuit, but such a problem has been corrected in FIG. 5 by feeding back the output of divider 14 rather than the output of phase shifter 15. The circuitry shown in FIG. 5 comprises, in addition to the circuit elements shown in FIG. 3, a crystal oscillator 23; a mixer 24 for mixing the output of the 4X frequency multiplier 12 and the output of the crystal oscillator 23 to provide an output signal having a frequency which is the difference between the frequencies of these outputs; a ¼ frequency divider 25 for subjecting the output of the crystal oscillator 23 to ¼ frequency division; and a mixer 26 for mixing the output of the ¼ frequency divider 25 and the output of the variable phase shifter 15, which has been amplified by an amplifier 27, to provide a signal having a frequency which is the difference between the outputs of elements 25 and 27. Since the frequency of the input signal has been multiplied by a factor of four, the frequency of the output of the 4X frequency multiplier is very high, and the above-described circuit elements 23 through 26 are provided so that the center frequencies of the first and second BPF's 13 and 17 can be made lower.

In FIG. 5, the first ¼ frequency divider 14 is made up of two J-K flip-flop circuits 14-1 and 14-2. The variable phase shifter 15 is made up of four shift registers 15-1 through 15-4, four AND gates 15-5 through 15-8 and one OR gate 15-9. The logic circuit 22 comprises two A/D (analog-to-digital) converters 22-1 and 22-2, an OR/NOR gate 22-14, an up-down counter 22-3 and four AND gates 22-4 through 22-7. The up-down counter 22-3 includes two NOR gates 22-8 and 22-9, two J-K flip-flop circuits 22-10 and 22-11 and two AND gates 22-12 and 22-13.

The operation of the circuitry shown in FIG. 5 will now be described with reference to a waveform diagram shown in FIG. 6.

It is assumed that, under the initial conditions, the output phase of the OR gate 15-9 is at 0°, the content of the up-down counter 22-3 is 0, i.e., the Q2 and Q1 outputs are both at "L", both the count-up input of the up-down counter 22-3 (the $\bar{Q}$ output (q) of the A/D converter 22-2) and the count-down input (the $\bar{Q}$ output (q) of the A/D converter 22-1) are at "L", and the AND gates 15-5 through 15-8 in the variable phase shifter 15 are in a steady state outputting the Q3 output "0°" of the shift registers 15-1 through 15-4.

Let us consider the case where the output phase of the first ¼ frequency divider 14 is changed from 0° to 90° through cycle slip to thereby change the phase shifter 15 output as shown in FIG. 6(a). In FIG. 5, A/D converters 22-1 and 22-2 are operated by the leading edge of a clock signal from the OR output of gate 22-14, the waveform of which is shown in FIG. 6(c), and FF's 22-10 and 22-11 are operated by the leading edge of a clock signal at the NOR output of gate 22-14, the waveform of which is shown in FIG. 6(d). When the output phase of the divider 14 goes beyond the threshold line of 45° at t=1, the output level of the LPF 21a is changed from "H" to "L" due to feedback of the output of divider 14 to one input of mixer 20a. Then, at t=2, the output p of the LPF 21a is at "L" as shown in FIG. 6(b), and therefore the $\bar{Q}$ output of the A/D converter 22-1 is raised to "H" from "L". At the time of the leading edge trigger at t=2.5, the output of the A/D converter 22-1 is at "H" (while the output of the A/D converter 22-2 is still at "L") and therefore the content of the up-down counter is decreased from "0" to "3", i.e., both Q1 and Q2 are changed to "H". It should be appreciated that the up-down counter 22-3 is a counter operating in modulo four. At the instant in time when the output of the counter 22-3 is changed to "3" as shown in FIG. 6(f), the AND gates 15-5 through 15-8 stop the transmission of the Q3 output "0°" of the shift register stage 15-4 and allow the transmission of the Q0 output "−90°" from register stage 15-1. Therefore, the output phase of the variable phase shifter 15 is returned to 0° as shown in FIG. 6(a) and the output of LPF 21a is returned to its "H" state as shown in FIG. 6(b).

In the case where the output phase of the frequency divider 14 is changed to −90° from 0°, the opertion is substantially similar to that described above. In such a case, the content of the up-down counter 22-3 is increased to "1"=((Q2, Q1)=(L, H)) from "0" by the "H" output of the A/D converter 22-2 and subsequent clock pulse from the NOR output of gate 22-14, and the AND gates 15-5 through 15-8 in the variable phase shifter 15 stop the transmission of the Q3 output "0°" of the shift register stage 15-4 and allow the transmission of the Q2 output "+90°" from shift register stage 15-3. As a result, the output phase of the variable phase shifter 15 is similarly returned to 0°.

As has been already pointed out, the 180° cycle slip phase shift rarely occurs in the above-described circuit using the ¼ frequency dividers, and therefore the description of correction operation in such a case will be omitted. Such operation, however, will be apparent from an examination of the circuitry of FIG. 5.

As is apparent from the above description, according to this invention, in a carrier regenerating circuit for regenerating a carrier from an M-phase PSK signal, an auxiliary circuit is included having a second BPF whose band width is smaller than that of the first BPF in a main circuit, and the carrier signal phase of the auxiliary circuit is compared with the carrier signal phase of the main circuit so that the phase of the output of the main circuit can be shifted according to the comparison result. Therefore, the carrier regenerating circuit according to this invention can decrease the frequency of occurrence of cycle slip without degrading the carrier regenerating characteristics. Furthermore, the carrier regenerating circuit of the invention is simple in arrangement and can be manufactured at a low cost.

What is claimed is:

1. In a carrier regenerating circuit of the type having a first signal path, including a first band pass filter, for regenerating a first carrier signal from a received M-phase shift keying (PSK) signal, where M is an integer greater than one, the improvement comprising:
   a second signal path, including a second band pass filter having a narrower band width band than said first band pass filter for generating a second carrier signal from said PSK signal;
   phase comparison means for phase comparing said first and second regenerated carriers; and
   variable phase shift means for receiving said first regenerated carrier signal and shifting the phase thereof in accordance with the results of said phase comparison.

2. A carrier regenerating circuit as defined in claim 1, wherein said first signal further includes a first multiplier for multiplying the frequency of said received signal by M and providing a frequency multiplied signal to an input of said first band pass filter, and a first divider for dividing the frequency of an output of said first band pass filter by M; and wherein said second band pass filter receives its input from said first multiplier and said second signal path further includes a second divider for dividing the output frequency of said second band pass filter by M.

3. A carrier regenerating circuit as defined in claim 1, wherein said phase comparison means comprises:
   a first phase shifter for phase advancing said second regenerated carrier;
   a second phase shifter for phase retarding said second regenerated carrier;
   a first mixer for phase comparing the output of said variable phase shifter with said phase advanced signal;
   a second mixer for phase comparing the output of said variable phase shifter with said phase retarded signal; and
   logic circuitry responsive to phase comparison results of said first and second mixers for controlling said variable phase shifter in response thereto.

4. A carrier regenerating circuit as defined in claim 3, wherein said phase comparison means further comprises a first low pass filter for receiving the output from said first mixer and providing a first phase comparison signal in response thereto, and a second low pass filter for receiving said output of said second mixer and providing a second phase comparison signal in response thereto, wherein said logic circuitry comprises:
   first analog-to-digital (A/D) conversion means for converting said first phase comparison signal to digital form;
   second A/D conversion means for converting said second phase comparison signal to digital form;
   a source of clock pulses; and
   an up/down counter for counting said clock pulses in a direction determined by the outputs of said first and second A/D conversion means, the count value in said counter controlling said variable phase shift means.

5. A carrier regenerating circuit as defined in any one of claims 3-4, wherein said variable phase shifter comprises a multiple-stage shift register and means responsive to an output signal from said logic circuitry for selecting an output from one of said shift register stages.

6. A carrier regenerating circuit according to any one of claims 1 and 2-4, wherein said phase comparison means receives said first regenerated carrier from the output of said variable phase shift means.

7. A carrier regenerating circuit as defined in any one of claims 1 and 2-4, wherein said phase comparison means receives said first regenerated carrier from the input to said variable phase shift means.

* * * * *